April 10, 1945.                L. H. PALMER                2,373,334
                              REGULATOR SYSTEM
                     Filed Aug. 15, 1942          3 Sheets-Sheet 1

INVENTOR
Leroy H. Palmer
BY John Flann
ATTORNEY

April 10, 1945.　　　　L. H. PALMER　　　　2,373,334
REGULATOR SYSTEM
Filed Aug. 15, 1942　　　　3 Sheets-Sheet 2
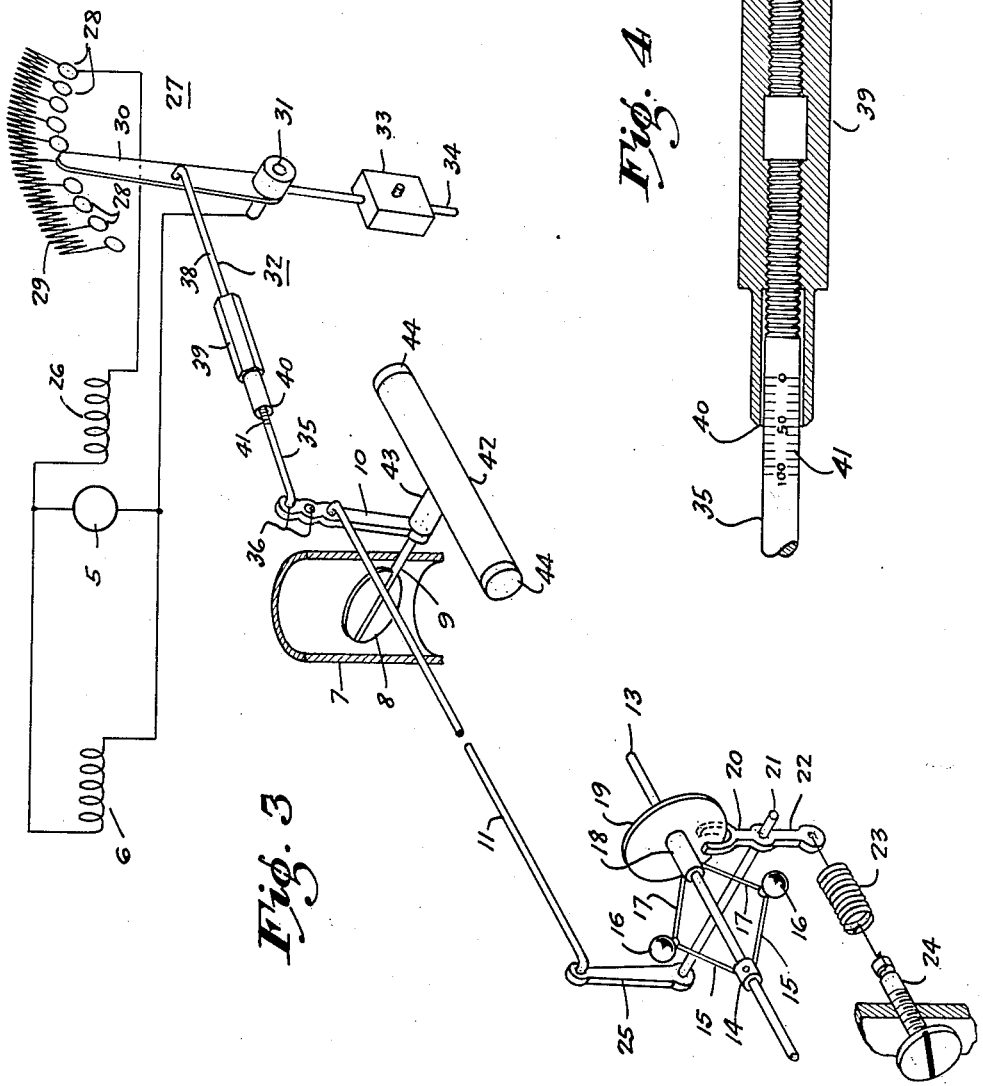
INVENTOR
Leroy H. Palmer
BY John Flam
ATTORNEY April 10, 1945.  L. H. PALMER  2,373,334
REGULATOR SYSTEM
Filed Aug. 15, 1942   3 Sheets-Sheet 3

INVENTOR
Leroy H. Palmer
Y John Flam
ATTORNEY

Patented Apr. 10, 1945

2,373,334

UNITED STATES PATENT OFFICE 2,373,334

REGULATOR SYSTEM

Leroy H. Palmer, Bell, Calif.

Application August 15, 1942, Serial No. 454,954

3 Claims. (Cl. 290—40).

This invention relates to a system for regulating the electromotive force generated by a prime mover.

Electric generator plants are now extensively used in the form of portable power units. Almost all of these units utilize an internal combustion engine as the prime mover, and driving an alternator. The loads imposed on such an alternator often include synchronous or induction motors. Such loads have definite speed relations to the speed of the alternator, and therefore to the speed of the engine that drives the alternator. Accordingly, since such loads are designed to operate most effectively within a narrow speed range, it is essential that the speed of the prime mover be regulated to agree with these limits, as the load on the alternator is varied. Such a regulator is described and claimed in Patent No. 2,225,883, granted December 24, 1940, to L. H. Palmer for Prime mover control system.

Another important condition imposed upon the alternator is that its terminal electromotive force be maintained within narrow limits even under widely varying load conditions. It is well known that the armature reaction and impedance drop are both increased as the current increases, with an attendant reduction of the electromotive force at the terminals of the alternator. It is possible to maintain the terminal electromotive force either by increasing the speed of the alternator, or by increasing the field strength. An increase in speed is out of the question, for as pointed out hereinabove, the frequency of the alternator should be maintained within close limits.

It is one of the objects of this invention to make it possible in a simple and inexpensive manner, to adjust the field excitation for maintaining the terminal electromotive force substantially constant.

When an inductive load, such as a motor load, is connected to the alternator, it is ordinarily difficult to start the motor under load. This is due almost entirely to the fact that the load under starting conditions is a highly inductive one; this means that the power factor is low, and therefore for a given power output, the load must draw a very heavy current. Such heavy current, as heretofore pointed out serves to depress the available electromotive force. Such a reduction in turn necessitates that a still greater current be drawn to obtain the desired power for the power delivered depends directly upon the available electromotive force.

These difficulties in starting an inductive motor load are effectively overcome by the aid of this invention. It is accordingly another object of this invention to make it possible to regulate the excitation of an alternator as to take into account the inductive characteristic of the load.

It is still another object of this invention to make it possible to adjust the excitation of an alternator not only in accordance with the load but also in accordance with the power factor thereof.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense; since the scope of this invention is best defined by the appended claims.

Referring to the drawings:

Fig. 3 is a pictorial view, partly in section, of the important parts of the control system, shown as connected to an exciter for the alternator;

Fig. 4 is an enlarged sectional view of a portion of the apparatus illustrated in Fig. 3.

Figure 1:
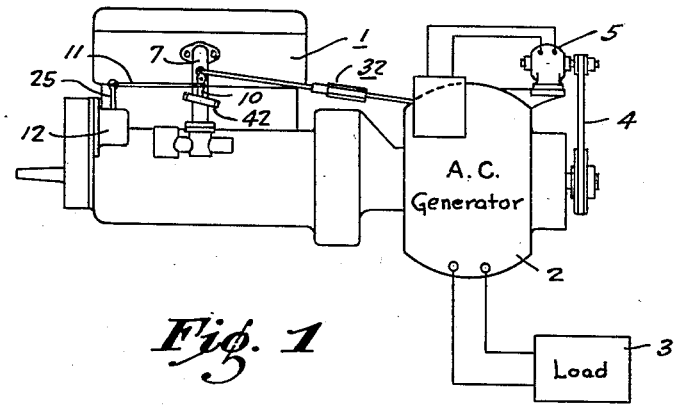
Figure 1 is a diagrammatic elevation of a system incorporating the invention.

In Fig. 1, the internal combustion engine 1 is indicated as a prime mover for driving the alternating current generator 2. This engine may be a gasoline engine or a Diesel engine or the like. The drive coupling between the prime mover 1 and the alternator 2 may be of any desired type. The alternator 2 is shown as connected to load 3.

The internal combustion engine 1 is so arranged that it supplies power as through a belt 4 to a direct current exciter 5. This direct current exciter 5 is used to supply electrical energy to the field winding 6 of the alternator in a well understood manner (Fig. 3).

By the aid of appropriate governor mechanism hereinafter to be described, the speed of the alternating current generator is kept substantially constant. In this way the frequency of the generated current is also maintained substantially constant; and in addiiton, the exciter 5 is also driven at substantially constant speed.

The character of the load 3 in many instances may be highly inductive, such as self-starting synchronous motors or induction motors. Under such circumstances as is well known, the load current lags in phase behind the electromotive force, and the power factor is low. As compared with a load utilizing unity power factor, such a load requires a much heavier current to develop the same power.

Under these circumstances the impedance drop in the winding of the alternator 2, as well as armature reaction, serve very materially to reduce the available terminal electromotive force. It is accordingly essential to improve the performance of the system by maintaining this terminal electromotive force substantially constant even during periods when the current drain upon the system is quite high.

In the present instance this regulation is effected by controlling the electromotive force generated by the exciter 5 so that as required, the exciter 5 supplies an increased current to the field 6 (Fig. 3) of the alternator 2.

Figure 2:
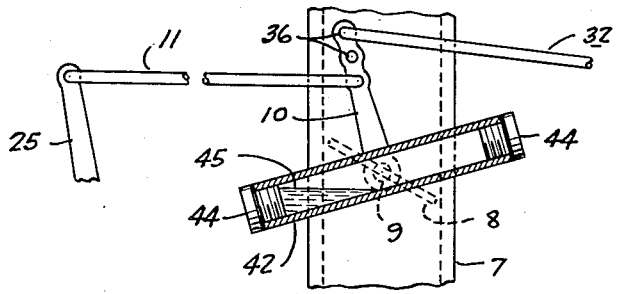
Fig. 2 is an enlarged fragmentary view, partly in section, of a portion of the control mechanism incorporated in the system of Fig. 1.

The prime mover 1 is provided with an intake manifold 7 (Figs. 1, 2 and 3). A throttle 8 is located within the intake manifold and is shown as of the usual butterfly type. The amount of fuel delivered into the intake of the engine 1 is controlled by the position of this throttle.

The throttle is angularly movable about the axis of a shaft 9 which carries the throttle valve 8. This shaft 9 carries an operating arm or lever 10, by the aid of which the shaft 9 may be rocked to control the opening of the throttle valve.

For operating the shaft 9, use is made of a link 11 that is arranged to be operated by a governor mechanism indicated in general as enclosed in the casing 12 in Fig. 1. It is also diagrammatically illustrated in Fig. 3.

Referring now more particularly to Fig. 3, the governor shaft 13 is arranged to be driven through appropriate mechanism by the prime mover 1. This shaft 13 has affixed to it a collar 14 serving to provide pivots for a number of fly ball governor arms 15. The ball weights 16 are also shown as connected by the pivoted links 17 to a sleeve 18, axially slidable upon the shaft 10. This sleeve is shown as carrying a disk 19. As the speed increases, the balls 16 fly outwardly and the disk 19 is thereby moved toward the left as viewed in Fig. 3. A reduction in speed conversely causes the disk 19 to be moved toward the right, since the balls 16 assume a position closer to the axis of the governor shaft 13.

It is usually essential in governors of this type to provide a force resiliently opposing the action of the centrifugal force upon the balls 16. The resilient force in this instance is rendered effective by the aid of a fork 20, embracing the disk 19 and fixed to a rock shaft 21. The fork has a downwardly extending arm 22. To the lower end of this arm is anchored one end of a tension spring 23. The other end of the tension spring is shown as anchored in an adjustable abutment such as a screw 24. By the aid of the screw 24, the tension of spring 23, and consequently the force opposing the centrifugal action of the balls 16, may be adjusted.

The rock shaft 21 is oscillated and its angular position adjusted by the axial movement of the disk 19, acting upon the fork 20. This rock shaft 21 may accordingly be utilized to provide the connection between the governor mechanism and the throttle control lever 10. For this purpose the rock shaft 21 is provided with an arm 25 to which the left hand end of link 11 is pivoted.

As the rock shaft 21 is adjusted in position due to a variation in the axial position of the disk 19, there is a corresponding adjustment of the throttle valve 8. The particular position of the throttle valve 8 depends upon the load carried by the prime mover 1. Accordingly the excitation of the field winding 6 of the alternator may be made to be dependent upon the position of the throttle 8. For this purpose the field winding 26 of the exciter 5 is shown as controlled by the aid of a rheostat mechanism 27. This rheostat mechanism 27 includes a series of contact buttons 28 to which are connected taps from a resistance 29. The buttons 28 are arranged in arcuate formation, adapted to be contacted by rheostat arm 30. This rheostat arm 30 is shown as pivoted about a stationary pivot 31.

The angular position of the rheostat arm 30 is controlled in accordance with the angular position of the throttle 8. For this purpose use is made of a link structure 32, which connects arm 30 with the lever 10. Thus as the throttle 8 is opened, corresponding to an increased load, the link 32 moves toward the right and causes arm 30 to contact buttons 28 farther toward the right, thereby reducing the resistance included in the circuit of the shunt field 26. The exciter 5 thereby is caused to generate a higher potential difference, and the field winding 6 of the alternator is correspondingly supplied with a larger exciting current.

It is desirable that the force required to move the arm 30 about its shaft 31 be as low as possible. For this purpose a counterweight 33 may be provided for the arm 30, and adjustable along the extension 34 carried by the arm 30.

Furthermore, it may be desirable to adjust the extent of the total angular movement of the arm 30. For this purpose the left hand end 35 of the link mechanism 32 is shown as capable of being accommodated in any one of a series of apertures 36 in arm 10. By appropriate choice of the aperture 36 the extent of angular movement of the arm 30 may be controlled.

The position of throttle 8 depends upon the load imposed upon the prime mover 1. If the load is inductive, the current flowing through the load is greater than if the load be non-inductive. But if the load be inductive, the excitation of the alternator field 6 should be greater than for loads of less inductance. To make this possible, the angular position of arm 30 may be independently adjusted to comply with the power factor condition, as by adjustment of the upper and lower limits of the angular movement of arm 30. In order to accomplish this, the link mechanism 32 is made adjustable in length (Fig. 4). The link mechanism includes the left hand portion 35 as well as a right hand portion 38. These are provided with right and left hand threads operating in a turnbuckle 39. The turnbuckle 39 may be provided with a narrow pointer edge 40 cooperating with the scale marks 41 provided on the right hand extremity of the left hand portion 35.

Lengthening of link mechanism 32 causes arm 30 to be moved toward the right and to reduce the resistance in the field circuit for all corresponding positions of throttle 8. The degree of such lengthening is made in accordance with the prevailing power factor of the load 3.

As thus far described, the centrifugal governor control is quite conventional. It has been found that such a conventional governor control by itself is incapable to keep the speed of the prime mover 1 substantially constant. As heavier loads are demanded of the prime mover 1, the governor mechanism does not have a sufficient action on the throttle 8.

In order to enable the governor mechanism to conform to these requirements imposed by the inherent characteristics of the internal combustion engine, use is made of an apparatus which during idling and up to an intermediate value of load, has an action opposing the opening of the throttle by the governor; but beyond that point an action takes place to aid the governor in urging the throttle toward open position.

This effect is obtained by providing a tubular structure with a movable weight therein. Thus mounted upon the extension of shaft 9 is a tube 42. This may be accomplished, for example, by providing a boss 43 attached to the throttle shaft 9. It is possible in this manner to adjust the relative angular position of the tube 42 with respect to the throttle 8. The tube 42 is furthermore shown as closed at both ends as by the aid of the plugs 44, which may be held detachably in place by being threaded therein. Within the tube is the heavy liquid 45, such as mercury.

As illustrated in Fig. 2, the relative angular positions of the axis of the tube 42 and of the throttle 8 are such that in the idling position illustrated in Fig. 2 the weight of the liquid 45 is effective to urge the throttle 8 toward closing. This action is maintained until the throttle 8 is opened by the governor action to a point corresponding to about 60% of the rated load. At that point the liquid 45 moves to the opposite end of the tube 42, and ultimately for full load the tube 42 takes the position illustrated in Fig. 1. The position of the axis of the tube 42 with respect to the pivoting axis, of throttle shaft 9 is such that the liquid 45 is in unstable equilibrium when the axis of the tube 42 is on the horizontal, and any increment of rotation beyond the horizontal causes the liquid to move to the lowered end of the tube. In this unstable horizontal position the liquid 45 is neutral as regards its effect on the governor. As soon as this unstable horizontal position is passed, as the throttle 8 is opening, the weight of the liquid 45 provides a supplemental force that urges the throttle toward its fully opened position.

By appropriate proportioning of the weight of liquid 45 and of the length of the tube 42 to provide the necessary leverage, and in accordance with the setting of the adjusting screw 24 for the governor spring 23, the required limits of speed variation may be attained.

Figure 5:
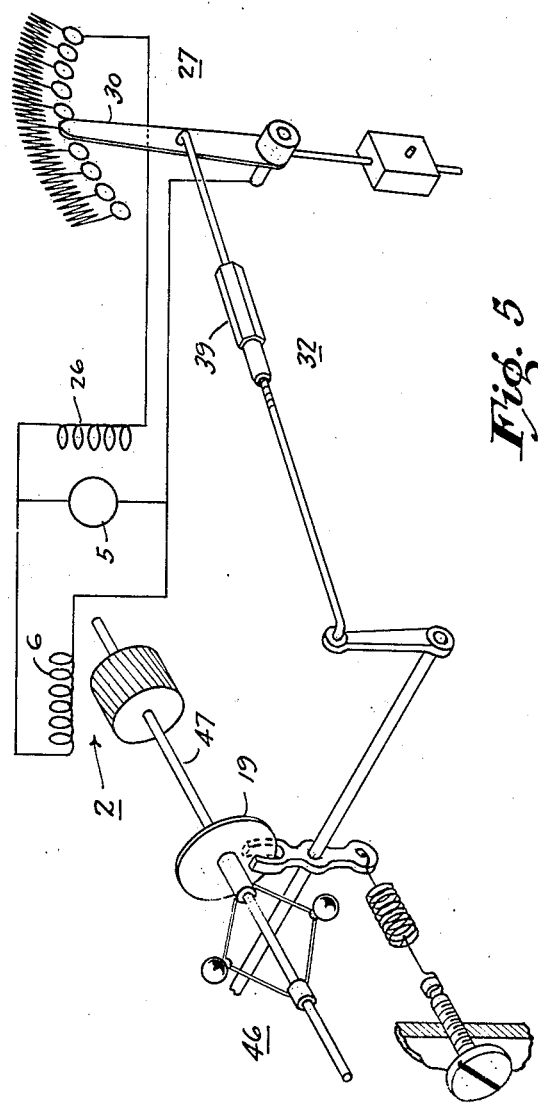
Fig. 5 is a diagram of a modified form of the invention.

In the form of the invention illustrated in Fig. 5, the speed of the alternator 2 is used to determine the setting of the rheostat arm 30. For this purpose the alternator shaft 47 is shown as operating the governor mechanism 46 illustrated as being similar to that of the form shown in Fig. 3. The axial position of disk 19 on this governor mechanism determines directly the position of the arm 30. The turnbuckle structure 39 is adjustable as before, to take care of varying power factor loads.

What is claimed is:

1. In a system of the character described, an internal combustion engine having a throttle, an alternator driven by the engine and having a field winding, means for increasing the excitation of said field winding in accordance with movement of the throttle toward fully open position, and means for adjusting the position of the throttle for maintaining the speed of said engine substantially constant, comprising a device responsive to the speed of the engine and urging the throttle toward fully open position as the speed decreases, and means responsive to the passage of the throttle through a definite position toward fully open position, providing a supplemental force that urges the throttle toward fully open position.

2. In a system of the character described, an internal combustion engine having a throttle, an alternator driven by the engine and having a field winding, means for increasing the excitation of said field winding in accordance with movement of the throttle toward fully open position, and means for controlling the throttle to maintain the speed of said engine substantially constant, comprising a device responding to the speed of the engine and urging the throttle toward fully open position upon a decrease in speed, and a weight member connected to the throttle urging the throttle toward closed position until the throttle reaches a position intermediate fully closed and fully open position, when said weight is shifted to urge the throttle toward fully open position.

3. In a system of the character described, a throttle controlled internal combustion engine, an alternator driven by said engine, said alternator having a field winding, means controlling the throttle position for maintaining the speed of said prime mover substantially constant for varying loads, and means for increasing the excitation of said field winding in accordance with movement of the throttle toward fully open position, said excitation increasing means including a variable resistance, and mechanism for controlling said resistance, said mechanism being adjustable to provide settings in accordance with the power factor of the load, said mechanism being also provided with calibrations corresponding to the power factor settings.

LEROY H. PALMER.